United States Patent
MacNeill (10) Patent No.: US 9,563,628 B1
(45) Date of Patent: Feb. 7, 2017

(54) METHOD AND SYSTEM FOR DELETION HANDLING FOR INCREMENTAL FILE MIGRATION

(71) Applicant: EMC Corporation, Hopkinton, MA (US)

(72) Inventor: Stuart D. MacNeill, South Queensberry (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 13/710,715

(22) Filed: Dec. 11, 2012

(51) Int. Cl.
    *G06F 17/30* (2006.01)
    *G06F 7/00* (2006.01)

(52) U.S. Cl.
    CPC ... *G06F 17/30002* (2013.01); *G06F 17/30067* (2013.01)

(58) Field of Classification Search
    CPC ........... G06F 17/30067; G06F 17/30489; G06F 3/0641; G06F 3/0608; G06F 9/52
    USPC ........................................................ 707/692
    See application file for complete search history.

(56) References Cited

U.S. PATENT DOCUMENTS

| 7,797,279 B1* | 9/2010 | Starling | G06F 11/1451 707/641 |
| 2006/0129616 A1* | 6/2006 | Chen | G06F 17/30176 |
| 2009/0164534 A1* | 6/2009 | Mercer | G06F 3/061 |
| 2010/0332818 A1* | 12/2010 | Prahlad | G06F 17/3002 713/150 |
| 2012/0047107 A1* | 2/2012 | Doddavula et al. | 707/620 |
| 2012/0084523 A1* | 4/2012 | Littlefield | G06F 11/1469 711/162 |
| 2012/0297246 A1* | 11/2012 | Liu et al. | 714/15 |
| 2013/0054523 A1* | 2/2013 | Anglin | G06F 17/30575 707/624 |

* cited by examiner

*Primary Examiner* — Usmaan Saeed
*Assistant Examiner* — Raquel Perez-Arroyo
(74) *Attorney, Agent, or Firm* — Dergosits & Noah LLP; Todd A. Noah (57) ABSTRACT

Deletion handling for incremental file migration is described. Data is received from a storage device. A modified directory is identified in the data. A list is created of files associated with the modified directory in the source device. Any files associated with the modified directory that are absent from the list of files are deleted from a storage device.

20 Claims, 3 Drawing Sheets

METHOD AND SYSTEM FOR DELETION HANDLING FOR INCREMENTAL FILE MIGRATION

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values' embedding in database's data structures) within dedicated backup files. When a database administrator decides to return a database to a previous state, the database administrator specifies the desired previous state by identifying a desired point in time when the database was in this state, and instructs the backup application to execute a restore operation to restore the corresponding backup files for that state to the database.

The standard Network Data Management Protocol (NDMP) provides a mechanism to facilitate file system backup and restore operations between compatible storage devices and backup devices. However, NDMP is unsuitable for heterogeneous backup and restore operations when a backup needs to be created for and stored on a storage device that does not support any of the source device's data formats. NDMP can also be used to provide file and directory migration functionality to copy data from a source device to a storage device by connecting the source device to the storage device, executing a "backup" operation on the source device, and executing a "restore" operation on the storage device. Similar to the backup and restore operations using NDMP, this "NDMP copy" process functions properly only if the source and storage devices support at least one compatible data format. NDMP enables an incremental backup by specifying that only files and directories modified after a selected point in time need to be copied from the source device to the storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, NDMP does not correctly migrate deletions from a source device to a storage device using the incremental "NDMP copy" procedure. For example, if a file Y is deleted from a directory 1 that includes the file X and the file Z on a source device, NDMP identifies a modified directory 1 and no files that need to be updated because NDMP does not include updates for deleted files, and therefore provides data for the modified directory 1 with no copies of files to the storage device. The storage device may indicate a modification to the directory 1 but does not delete the storage device's copy of file Y. The source device no longer includes the file Y in the directory 1, but the storage device continues to include the copy of file Y in the storage device's copy of the directory 1. In this example, the backup data stored on the storage device no longer matches the data stored on the source device, which defeats the goal of accurately maintaining backup data for potentially restoring the source device.

Embodiments herein provide an EMC® cloud tiering appliance that uses NDMP to enable heterogeneous directory and file migration functionality. The cloud tiering appliance functions in the middle of an "NDMP copy" process to perform data format conversions between the source and storage devices. The cloud tiering appliance connects to the source device using NDMP, initiates a backup operation, connects to the storage device using NDMP, and initiates a restore operation. The cloud tiering appliance receives the backup data from the source device, parses the backup data's format, and converts the parsed backup data to a format supported by the storage device. Then the cloud tiering appliance streams the converted backup data to the storage device, where the converted backup data is restored. The cloud tiering appliance may use this process to perform an initial full migration, followed by a number of incremental migrations to migrate any directories or files that are modified or deleted since the previous file migration.

The cloud tiering appliance also enables correct migration of deletions between a source device and a storage device. The cloud tiering appliance uses NDMP to facilitate the incremental migration of file and directory data between source and storage devices. After the cloud tiering appliance uses NDMP to receive data from a source device, the cloud tiering appliance identifies a modified directory in the data. For example, the cloud tiering appliance identifies the directory 1 as a modified directory from the data just received from the source device. A list is created of files for a modified directory in a source device. For example, the cloud tiering appliance creates a list of the files X and Z as the files for the directory 1 in the source device. Any files for the directory on the storage device that are absent from the list of files for the directory on the source device are deleted from the storage device. For example, the cloud tiering appliance deletes the storage device's copy of file Y from the storage device's copy of directory 1 and does not delete the storage device's copy of files X and Z from the storage device's copy of directory 1 because the list specifies that the directory 1 on the source device includes only the files X and Z. The cloud tiering appliance enables correct migration of deletions between source and storage devices and uses NDMP to facilitate the incremental migration of file and directory data between source and storage devices of different types that support incompatible data formats.

Figure 1:
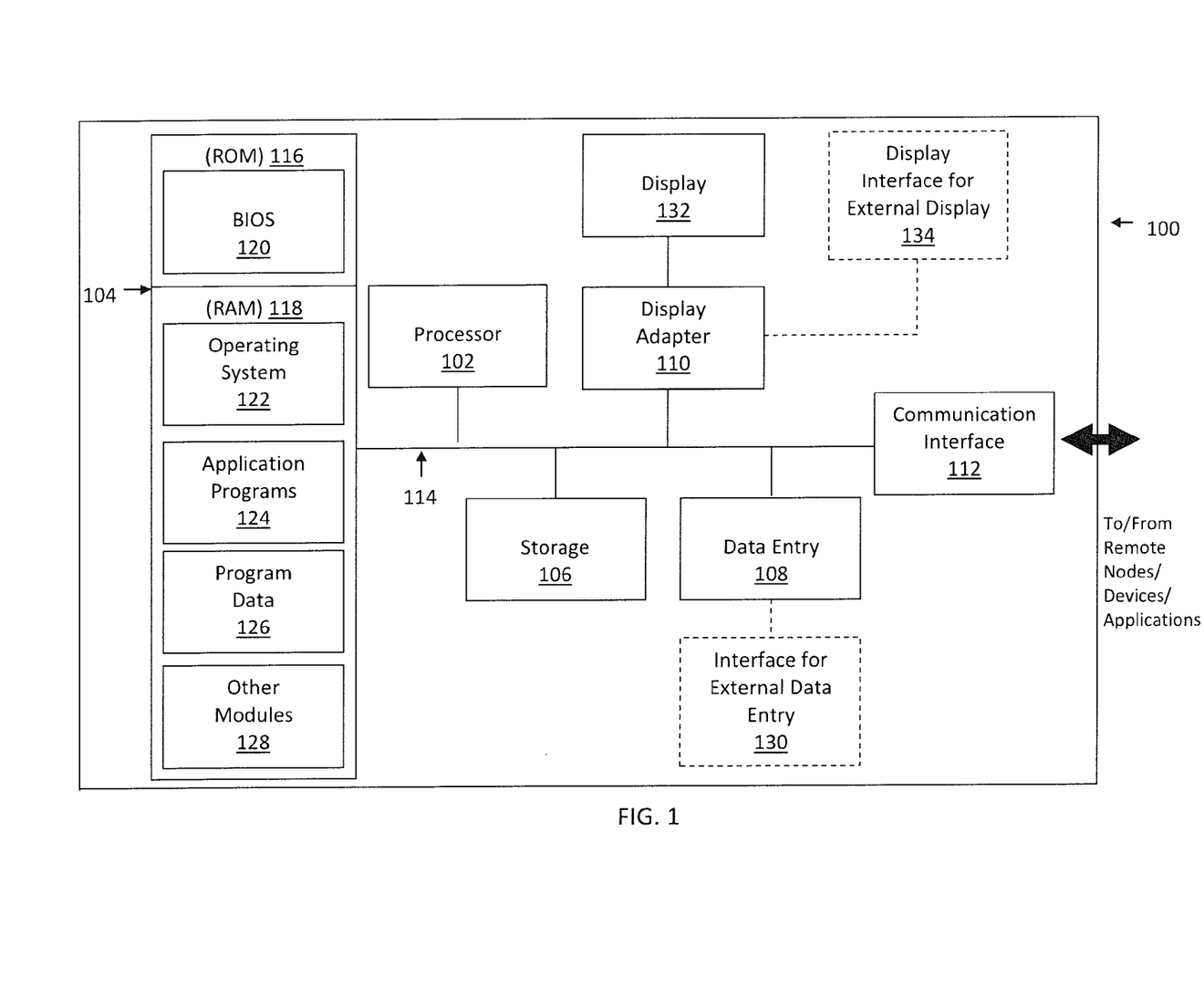
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for deletion handling for incremental file migration.

In the prior art, NDMP does not function properly if the source and storage devices support incompatible data formats, and NDMP does not correctly migrate deletions from a source device to a storage device using the incremental "NDMP copy" procedure. Embodiments herein enable correct migration of deletions between source and storage devices and use NDMP to facilitate the incremental migration of file and directory data between source and storage devices of different types that support incompatible data formats.

Figure 2:
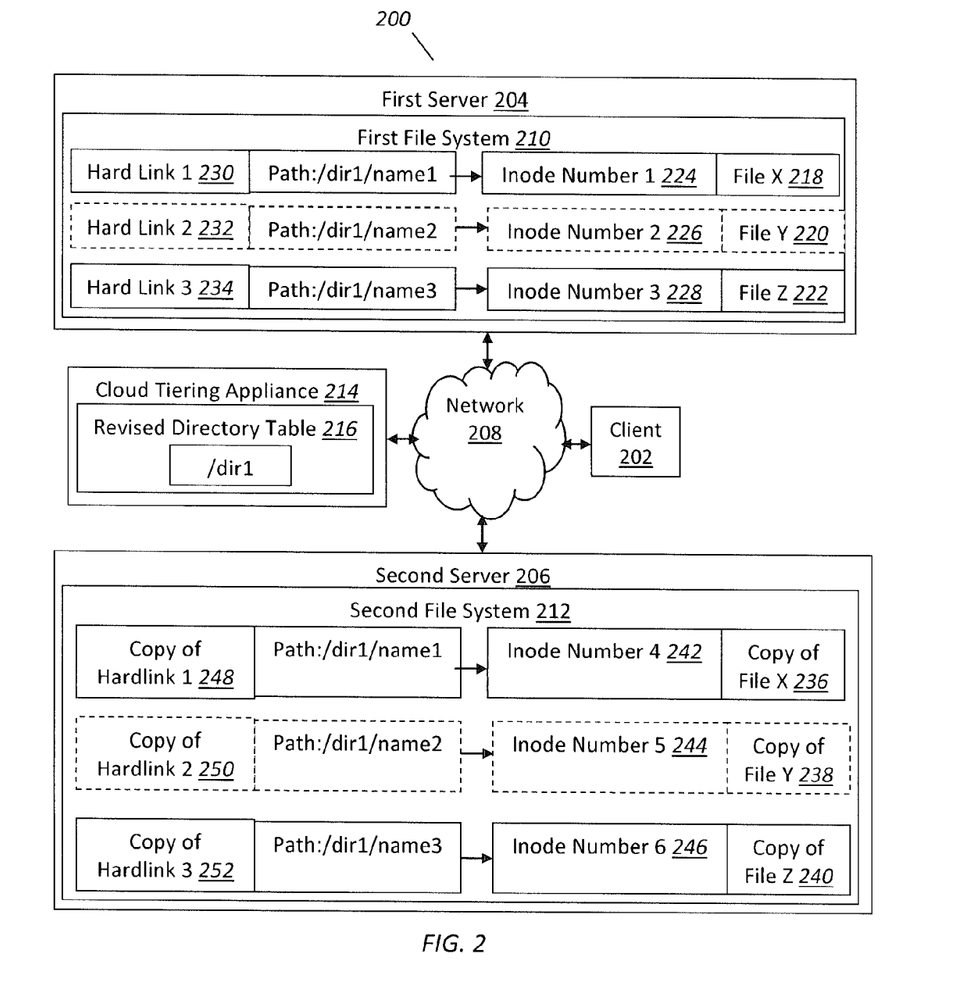
FIG. 2 illustrates a block diagram of an example system for deletion handling for incremental file migration, under an embodiment.

FIG. 2 illustrates a block diagram of a system that implements deletion handling for incremental file migration, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202 and the servers 204-206 communicate via a network 208. The first server 204 includes a first file system 210, while the second server 206 includes a second file system 212. The first server 204 migrate files to the second server 206 via a cloud tiering appliance 214. The cloud tiering appliance 214 includes a revised directory table 216. Although FIG. 2 depicts the system 200 with one client 202, two servers 204-206, one network 208, two file systems 210-212, one cloud tiering appliance 214, and one revised directory table 216, the system 200 may include any number of clients 202, servers 204-206, networks 208, file systems 210-212, cloud tiering appliances 214, and revised directory tables 216. The client 202 and the servers 204-206 may each be substantially similar to the system 100 depicted in FIG. 1.

FIG. 2 depicts an example of directories and files that are initially stored in the first file system 210 by the first server 204, migrated via the cloud tiering appliance 214 to be stored in the second file system 212 by the second server 206, and stored in the second file system 212 by the second server 206 as a backup copy of the first file system 210. The first file system 210 includes a file X 218, a file Y 220, and a file Z 222. Each of the files 218-222 is uniquely identified within the first file system 210 by a numerical inode number. An inode, or index node, stores all of the information about a file or a directory, such as ownership, access mode, and type, but not data content, name, or location in a file system. The file X 218 is uniquely identified within the first file system 210 by the inode number 1 224, the file Y 220 is uniquely identified within the first file system 210 by the inode number 2 226, and the file Z 222 is uniquely identified within the first file system 210 by the inode number 3 228.

The first file system 210 also includes a hard link 1 230, a hard link 2 232, and a hard link 3 234. A hard link is a directory entry that associates a filename with a file in a file system. Each of the hard links 230-234 has an associated path that indicates the corresponding hard link's location within a hierarchical directory tree structure. The hard link 1 230 has the associated path/dir1/name1, the hard link 2 232 has the associated path/dir1/name2, and the hard link 3 234 has the associated path/dir1/name3. Each of the hard links 230-234 maintains a path value and a reference to one of the files 218-222 in the first file system 210. The hard link 1 230 references the file X 218 via the inode number 1 224, the hard link 2 232 references the file Y 220 via the inode number 2 226, and the hard link 3 234 references the file Z 222 via the inode number 3 228.

The cloud tiering appliance 214 maintains the revised directory table 216 during the process of incremental file migration from the first file system 210 to the second file system 212. The revised directory table 216 may include the directory path/dir1.

The objective of the initial full file migration performed by the cloud tiering appliance 214 is to copy the various hard links, paths and files present within the first file system 210 into the second file system 212. In the first, or baseline, phase of the initial full file migration, the cloud tiering appliance 214 opens an NDMP connection to the first server 204 and instructs the first server 204 to perform an NDMP backup operation which streams the contents of the first file system 210 over the NDMP connection. Then the cloud tiering appliance 214 opens an NDMP connection to the second server 206 and instructs the second server 206 to perform an NDMP restore operation. The cloud tiering appliance 214 then streams the data received from the backup operation into the connection with the second server 206. The second server 206 consumes this data stream and creates copies of the files, paths, and hard links in the second system file system 212, thereby copying the contents of the first file system 210 into the second file system 212.

The second server 206 includes a copy of file X 236, a copy of file Y 238, and a copy of file Z 240. The copy of file X 236 is uniquely identified within the second server 206 by the inode number 4 242, the copy of file Y 238 is uniquely identified within the second server 206 by the inode number 5 244, and the copy of file Z 240 is uniquely identified within the second server 206 by the inode number 6 246. Although the copies of files 236-240 stored in the second file system 212 are identical to the files 218-222 stored in the first file system 210, the inode numbers 242-246 stored in the second file system 212 are not identical to the inode numbers 224-228 stored in the first file system 210. The second file system 212 cannot store the same inode values that are received from the first file system 210 via a NDMP stream because the second file system 212 may have already allocated these inode values to other files (not depicted in FIG. 2) stored by the second file system 212. Therefore, while the file X 218 is uniquely identified within the first file system 210 by the inode number 1 224, which has the inode value of 1, the copy of file X 236 is uniquely identified within the second file system 212 by the inode number 4 242, which has the inode value of 4, not a copy of the inode value 1.

The second server 206 also includes a copy of hard link 1 248, a copy of hard link 2 250, and a copy of hard link 3 252. The copy of hard link 1 248 has the same associated path /dir1/name1 as the hard link 1 230, the copy of hard link 2 250 has the same associated path /dir1/name2 as the hard link 2 232, and the copy of hard link 3 252 has the associated path /dir1/name3 as the hard link 3 234. Each of the copies of hard links 248-252 maintains a path value and a reference to one of the copies of files 236-240 in the second file system 212. The copy of hard link 1 248 references the copy of file X 236 via the inode number 4 242, the copy of hard link 2 250 references the copy of file Y 238 via the inode number 5 244, and the copy of hard link 3 252 references the copy of file Z 240 via the inode number 6 246.

At some point in time after the completion of the baseline full file migration, the client 202 deletes the file Y 220, which is referenced by the path "/dir1/name2," and by the hard link 2 236 via the inode number 2 226, from the first file system 210. FIG. 2 illustrates the deletion of the file Y 220, the path "/dir1/name2," the hard link 2 232, and the inode number 2 226 from the first file system 210 by depicting the outlines of the file Y 220, the path "/dir1/name2," the hard link 2 232, and the inode number 2 226 from the first file system 210 with dashed lines.

The cloud tiering appliance 214 connects to a source device via NDMP to initiate a NDMP backup operation to re-synchronize the source device and the storage device due to the modification made to the first file system 210 since the most recent NDMP backup operation was performed. For example, the cloud tiering appliance 214 connects to the first server 204 via NDMP, and initiates an incremental NDMP backup operation to re-synchronize the first file system 210 and the second file system 212 due to the deletion of the file Y 220 and any other modifications made to the first file system 210 since the most recent NDMP backup operation was performed.

Then the cloud tiering appliance 214 receives data from the source device. For example, the cloud tiering appliance 214 receives data from the first server 204 which indicates that/dir1 has been modified since the most recent NDMP backup operation. The cloud tiering appliance 214 does not receive an indication of the deleted file Y 220 even though the file Y 220 has been deleted from the first file system 210 since the most recent file migration for creating a backup of the first file system 210 because NDMP does not include updates of deleted files.

If the source device and the storage device support incompatible data formats, the cloud tiering appliance 214 parses the data and converts the data to a data format that is supported by the storage device. For example, the cloud tiering appliance 214 parses the data which includes an indication that/dir1 has been modified since the most recent NDMP backup operation, and converts this data from a data format supported by the first server 204 to another data format supported by the second server 206. The cloud tiering appliance 214 is configured prior to file migration to specify the data formats used by the source device and the storage device. The cloud tiering appliance 214 may be modified to have the capability to convert the parsed data to any data format.

The cloud tiering appliance 214 connects to a storage device via NDMP to initiate a NDMP restore operation, and stores data on the storage device. For example, the cloud tiering appliance 214 connects to the second server 206 via NDMP, initiates a NDMP restore operation, and stores data, which may include an indication that/dir1 has been modified since the most recent NDMP backup operation, on the second server 206.

The incremental NDMP backup stream contains information about all the file, path, and hard link modifications made to the first file system 210 since the most recent NDMP backup operation was performed. The second file system 212 is not able to determine that the hard link 2 232, the path/dir1/name 2, the inode number 2 226, and the file Y 220 have been deleted from the first file system 210 because the information streamed by the incremental NDMP backup operation from the first file system 210 for the incremental NDMP restore operation on the second file system 212 is limited. Therefore, the second file system 212 is unable to delete the corresponding copy of hard link 2 250, the path/dir1/name 2, the inode number 5 244, and the copy of file Y 236. In this example, the incremental NDMP backup stream contains information that the directory "/dir1" has changed, but makes no mention that the hard link 2 232, the path/dir1/name 2, the inode number 2 226, and the file Y 220 have been deleted from the first file system 210.

The first file system 210 no longer includes the file Y 220 but the second file system 212 continues to include the copy of file Y 238. In this example, the backup data stored on the second file system 212 no longer matches the data stored on the first file system 210, which defeats the goal of accurately maintaining backup data for potentially restoring the first file system 210.

Although the continued existence of a single undeleted copy of file Y 238 in the second file system 212 in this simple and limited example may not appear to create a significant problem, over an extended period of time hundreds of incremental migrations that fail to update thousands of deletions to large files may result in thousands of large unnecessary files due to deletions that are not handled correctly. Using such a resulting backup copy to restore a file system would waste resources to migrate the thousands of large unnecessary files back to the source device, and waste much of the source device's storage through the storing of the thousands of large unnecessary files.

The cloud tiering appliance 214 identifies a modified directory in the data. For example, the cloud tiering appliance 214 identifies the modified directory/dir1 in the incremental NDMP backup stream from the first server 204, and adds the entry/dir1 to the revised directory table 216 to record the information that the directory path/dir1 has been updated. The cloud tiering appliance 214 identifies modified directories from which deletions may have been made instead of directly identifying deletions from the data migrated from the first file system 210 to the second file system 212 because NDMP does not include deletions when streaming data for incremental file migrations.

The cloud tiering appliance 214 creates a list of files associated with every modified directory in a source device. For example, the cloud tiering appliance 214 creates a list of the file X 218 and the file Z 222 for the directory/dir1 in the first file system 210 based on the directory/dir1 in the revised directory table 216. The list of files created may include subdirectories. The cloud tiering appliance 214 creates a list of files only for the few modified directories in a source device, rather than conducting a sub-tree walk on every directory in the source device's directory tree to create a list of files for every directory in a source device, a process which could consume a significant amount of time and resources.

The cloud tiering appliance 214 may use the name of a directory, the inode for the directory, the name of the directory's files, and/or the inodes for the directory's files to create lists of file for directories that correspond to any directory that has been identified in the revised directory table 216 as modified. The cloud tiering appliance 214 may use directory inodes to quickly identify the directory in the source device that corresponds to the directory identified as modified in the revised directory table 216 and quickly identify the files in the modified directory in the storage device that corresponds to the files listed for the directory in the source device. Using the inodes that identify modifies directories from the incremental NDMP backup stream received from the source device to identify directories in the source device may be significantly more efficient than comparing the copy of the modified directory in the storage device to every directory in the source device, a comparison which could consume a significant amount of time and resources.

The cloud tiering appliance 214 deletes any files for a modified directory from a storage device that are absent from the corresponding list of files for the directory in the source device. If any files for a modified directory in a storage device are absent from the corresponding list of files for the directory in the source device, the cloud tiering appliance 214 has to handle deletions for the incremental file migration. If no files for a modified directory in a storage device are absent from the corresponding list of files for the directory in the source device, the cloud tiering appliance 214 does not have to handle deletions for the incremental file migration. For example, the cloud tiering appliance 214 deletes the corresponding copy of hard link 2 250, the path/dir1/name 2, the inode number 5 244, and the copy of file Y 238. FIG. 2 illustrates the deletion of the copy of hard link 2 250, the path/dir1/name 2, the inode number 5 244, and the copy of file Y 238 by depicting the outlines of the copy of hard link 2 250, the path /dir1/name 2, the inode number 5 244, and the copy of file Y 238 with dashed lines. The cloud tiering appliance 214 may also delete any subdirectories associated with the modified directory that are absent from the list of files.

The cloud tiering appliance 214 handles deletions correctly, which results in the copies of the files and directories stored in the second server 206 matching the files and directories stored in the first server 204. The cloud tiering appliance 214 enables correct migration of deletions between the first server 204 and the second server 206, and uses NDMP to facilitate the incremental migration of file and directory data between the first server 204 and the second server 206 even if the first server 204 and the second server 206 support incompatible data formats.

Figure 3:
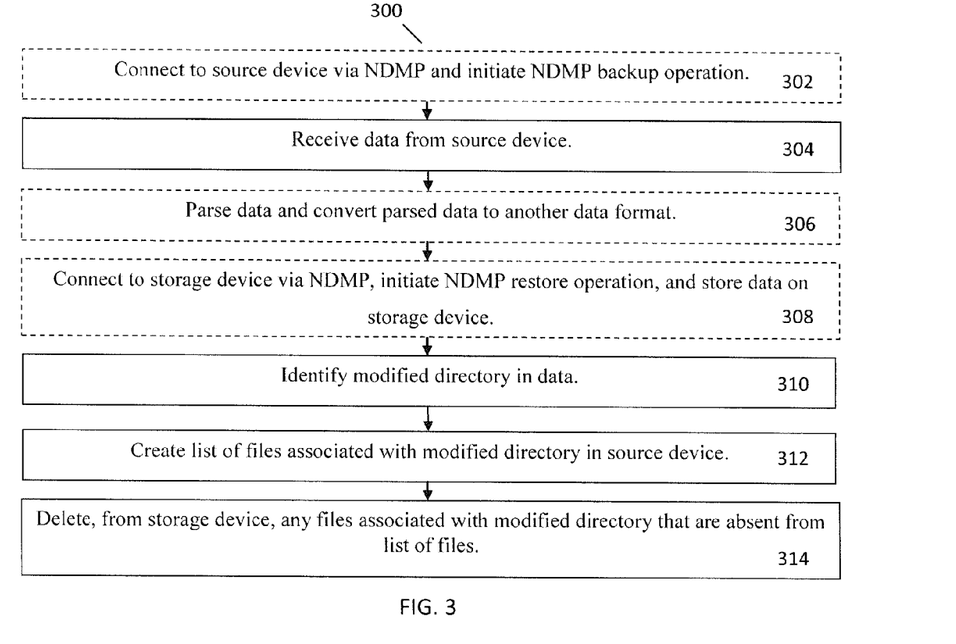
FIG. 3 is a flowchart that illustrates a method of deletion handling for incremental file migration, under an embodiment.

FIG. 3 is a flowchart that illustrates a method of deletion handling for incremental file migration. Flowchart 300 illustrates method acts illustrated as flowchart blocks for certain steps involved in and/or between the client 202 and/or the servers 204-206 of FIG. 2.

A source device is optionally connected via NDMP to initiate a NDMP backup operation from a source device, act 302. For example, the cloud tiering appliance 214 connects to the first server 204 via NDMP and initiates a NDMP backup operation from the first server 204.

Data is received from a source device, act 302. For example, the cloud tiering appliance 214 receives data, which includes an indication of a modification to the directory/dir1, for any updated files and directories from the first server 204.

Data is optionally parsed and optionally converted to another data format, act 306. For example, the cloud tiering appliance 214 parses the data for any updated files and directories, which includes an indication of a modification to the directory/dir1, and converts this data from a data format supported by the first server 204 to another data format supported by the second server 206.

A storage device is optionally connected via NDMP to initiate a NDMP restore operation, and data is optionally stored on a storage device, act 308, act 306. For example, the cloud tiering appliance 214 connects to the second server 206 via NDMP, initiates a NDMP restore operation, and stores data for any updated files and directories on the second server 206.

A modified directory is identified in the data, act 310. For example, the cloud tiering appliance 214 identifies the directory/dir1 as a modified directory in the data just stored in the second file system 212, and enters the directory path/dir1 in the revised directory table 216.

A list is created of files associated with a modified directory in a source device, act 312. For example, the cloud tiering appliance 214 creates a list of the file X 218 and the file Z 222 for the directory/dir1 in the first file system 210 based on the directory path/dir1 in the revised directory table 216.

Any files associated with a modified directory that are absent from the list of files for the directory in a source device are deleted from a storage device, act 314. For example, the cloud tiering appliance 214 deletes the copy of file Y 238 from the second file system 212 because the list of the file X 218 and the file Z 222 includes the file X 218 and the file Z 222 but does not include the file Y 220.

Although FIG. 3 depicts the acts 302-314 occurring in a specific order, the acts 302-314 may occur in another order. Embodiments herein enable the correct migration of deletions between the first server 204 and the second server 206, and use NDMP to facilitate the incremental migration of file and directory data between the first server 204 and the second server 206 even if the first server 204 and the second server 206 support incompatible data formats.

The use of the terms "a" and an and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for deletion handling for incremental file migration, the system comprising:
   one or more processors; and
   a non-transitory computer readable medium storing a plurality of instructions, which when executed cause the one or more processors to:
   connect to a source device via a Network Data Management Protocol;
   initiate a Network Data Management Protocol incremental backup operation;
   receive data from the source device via the Network Data Management Protocol backup operation;
   identify modified directories in the data received from the source device via the Network Data Management Protocol;
   add the identified modified directories to a revised directory table;
   create a list of files, each file in the list being identified from modified directories added to the revised directory table;
   connect to a storage device via the Network Data Management Protocol;
   initiate a Network Data Management Protocol restore operation on the storage device; and
   delete, from the storage device, any files associated with at least one directory in the storage device corresponding to at least one of the identified modified directories that are absent from the created list of files via the Network Data Management Protocol restore operation.

2. The system of claim 1, wherein the modified directory comprises a directory that was modified in the source device after previous data was received from the source device.

3. The system of claim 1, wherein the list of files comprises subdirectories.

4. The system of claim 3, wherein deleting any files comprises deleting any subdirectories associated with the modified directory that are absent from the list of files.

5. The system of claim 1, wherein the processor-based application is further configured to store the data on the storage device.

6. The system of claim 1, further comprising a cloud tiering device configured to receive the data in a first data format from the source device, parse the data, convert the parsed data to a second data format, and store the converted parsed data in the second data format on the storage device, wherein the first data format is incompatible with the second data format.

7. A computer-implemented method for deletion handling for incremental file migration, the method comprising:
   connecting to a source device via a Network Data Management Protocol;
   initiating a Network Data Management Protocol incremental backup operation;
   receiving data from the source device via the Network Data Management Protocol backup operation;
   identifying modified directories in the data received from the source device via the Network Data Management Protocol;
   adding the identified modified directories to a revised directory table;
   creating a list of files, each file in the list being identified from modified directories added to the revised directory table;
   connecting to a storage device via the Network Data Management Protocol;
   initiating a Network Data Management Protocol restore operation on the storage device; and
   deleting, from the storage device, any files associated with at least one directory in the storage device corresponding to at least one of the identified modified directories that are absent from the created list of files via the Network Data Management Protocol restore operation.

8. The computer-implemented method of claim 7, wherein the modified directory comprises a directory that was modified in the source device after previous data was received from the source device.

9. The computer-implemented method of claim 7, wherein the list of files comprises subdirectories.

10. The computer-implemented method of claim 9, wherein deleting any files comprises deleting any subdirectories associated with the modified directory that are absent from the list of files.

11. The computer-implemented method of claim 7, further comprising storing the data on the storage device.

12. The computer-implemented method of claim 7, further comprising: receiving the data in a first data format from the source device; parsing the data; converting the parsed data to a second data format; and storing the converted parsed data in the second data format on the storage device, wherein the first data format is incompatible with the second data format.

13. A computer program product comprising computer-readable program code to be executed by one or more processors when retrieved from a non-transitory computer-readable medium, the program code including instructions to:
- connect to a source device via a Network Data Management Protocol;
- initiate a Network Data Management Protocol incremental backup operation;
- receive data from the source device via the Network Data Management Protocol backup operation;
- identify modified directories in the data received from the source device via the Network Data Management Protocol;
- add the identified modified directories to a revised directory table;
- create a list of files, each file in the list being identified from modified directories added to the revised directory table;
- connect to a storage device via the Network Data Management Protocol;
- initiate a Network Data Management Protocol restore operation on the storage device; and
- delete, from the storage device, any files associated with at least one directory in the storage device corresponding to at least one of the identified modified directories that are absent from the created list of files via the Network Data Management Protocol restore operation.

14. The computer program product of claim 13, wherein the modified directory comprises a directory that was modified in the source device after previous data was received from the source device.

15. The computer program product of claim 13, wherein the list of files comprises subdirectories, and wherein deleting any files comprises deleting any subdirectories associated with the modified directory that are absent from the list of files.

16. The computer program product of claim 13, wherein the program code further includes instructions to store the data on the storage device.

17. The computer program product of claim 13, wherein the program code further includes instructions to: receive the data in a first data format from the source device; parse the data; convert the parsed data to a second data format; and store the converted parsed data in the second data format on the storage device, wherein the first data format is incompatible with the second data format.

18. The system of claim 1, the processor-based application being executed on a cloud tiering appliance, the cloud tiering appliance being communicatively coupled to the source device and the storage device by a network connection.

19. The computer-implemented method of claim 7, the method being executed on a cloud tiering appliance, the cloud tiering appliance being communicatively coupled to the source device and the storage device by a network connection.

20. The computer program product of claim 13, the instructions being executed on a cloud tiering appliance, the cloud tiering appliance being communicatively coupled to the source device and the storage device by a network connection.

* * * * *